United States Patent
Ogata et al.

(10) Patent No.: US 8,801,559 B2
(45) Date of Patent: Aug. 12, 2014

(54) VEHICULAR POWER TRANSMITTING SYSTEM

(75) Inventors: Yusuke Ogata, Toyota (JP); Yoshihiro Mizuno, Toyota (JP); Haruhiko Shibata, Okazaki (JP); Hidenobu Yamaguchi, Handa (JP); Fumitake Suzuki, Nishio (JP); Masahiko Suzuki, Anjo (JP); Masashi Hattori, Anjo (JP); Naoki Okoshi, Anjo (JP); Kenichi Mori, Anjo (JP); Masahiro Ito, Okazaki (JP)

(73) Assignees: Toyota Jidosha Kabushiki Kaisha, Toyota-shi (JP); Toyooki Kogyo Co., Ltd., Okazaki-shi (JP); JTEKT Corporation, Osaka-shi (JP); Aisin AW Co., Ltd., Anjo-shi (JP)

( * ) Notice: Subject to any disclaimer, the term of this patent is extended or adjusted under 35 U.S.C. 154(b) by 0 days.

(21) Appl. No.: 13/808,744

(22) PCT Filed: Jun. 30, 2011

(86) PCT No.: PCT/JP2011/003769
§ 371 (c)(1),
(2), (4) Date: Mar. 20, 2013

(87) PCT Pub. No.: WO2012/004953
PCT Pub. Date: Jan. 12, 2012

(65) Prior Publication Data
US 2013/0170953 A1    Jul. 4, 2013

(30) Foreign Application Priority Data

Jul. 7, 2010    (JP) .................................. 2010-155179

(51) Int. Cl.
*F16H 1/32*    (2006.01)
(52) U.S. Cl.
USPC .......................................... 475/162; 475/331

(58) Field of Classification Search
USPC .......................... 475/162, 163, 207, 210, 331
See application file for complete search history.

(56) References Cited

U.S. PATENT DOCUMENTS 5,063,816 A * 11/1991 Soga et al. ...................... 477/39
5,547,349 A    8/1996 Kimura et al.
(Continued)

FOREIGN PATENT DOCUMENTS

| EP | 1 927 754 | 6/2008 |
| JP | 2009 68473 | 4/2009 |
| JP | 2009 127569 | 6/2009 |

OTHER PUBLICATIONS

International Search Report Issued Feb. 3, 2012 in PCT/JP11/03769 Filed Jun. 30, 2011.

*Primary Examiner* — Justin Holmes
(74) *Attorney, Agent, or Firm* — Oblon, Spivak, McClelland, Maier & Neustadt, L.L.P.

(57) ABSTRACT

A vehicular power transmitting system including an oil pump constructed to sufficiently reduce a required drive torque. A high-pressure-port discharge amount of first and second high-pressure passages of the oil pump is determined such that an amount of consumption of working oil of relatively high pressure can be afforded only by the high-pressure-port discharge amount, during steady-state running of a vehicle in which engine speed is not lower than a predetermined threshold value corresponding to a predetermined lowest target input shaft speed of a continuously variable transmission for its shifting control. The pressure of the working oil discharged from first and second low-pressure discharge passages is kept at a predetermined low level, and the required drive torque of the oil pump is sufficiently reduced.

4 Claims, 7 Drawing Sheets

(56) References Cited

U.S. PATENT DOCUMENTS

| | | |
|---|---|---|
| 5,669,761 A | 9/1997 | Kobayashi |
| 2002/0094910 A1 | 7/2002 | Endo et al. |
| 2005/0233842 A1* | 10/2005 | Shioiri et al. .................. 474/19 |
| 2011/0014078 A1* | 1/2011 | Ono et al. ..................... 418/166 |

* cited by examiner

VEHICULAR POWER TRANSMITTING SYSTEM

TECHNICAL FIELD

The present invention relates to a vehicular power transmitting system including an oil pump of an internal contact type having a high-pressure discharge passage and a low-pressure discharge passage, and more particularly to techniques for reducing a drive torque of the oil pump.

BACKGROUND ART

There is known an oil pump of an internal contact gear pump type having a driving gear rotated about its axis by an engine, an annular driven gear having internal teeth meshing with external teeth of the driving gear and rotatable by the driving gear about an eccentric axis eccentric with respect to the axis of the driving gear, a pump chamber accommodating the driving gear and the driven gear, and a housing having a plurality of pressure chambers which are open in a side surface of the pump chamber to discharge a working oil from the pump chamber and which are formed between mutually meshing surfaces of the external and internal teeth such that the pressure chambers are spaced apart from each other in a circumferential direction of the driving and driven gears, the housing further having a high-pressure discharge passage and a low-pressure discharge passage which communicate with the plurality of pressure chambers one after another in the process of decrease of volume of each of the pressure chambers while the pressure chambers are moved in a direction of rotation of the driving and driven gears, the oil pump being operated such that a pressure of the working oil to be discharged through the low-pressure discharge passage is held lower than a pressure of the working oil discharged from the high-pressure discharge passage by a predetermined amount, when an amount of consumption of the working oil of a relatively high pressure can be afforded by only an amount of discharge of the working oil from the high-pressure discharge passage. Patent Documents 1 and 2 disclose examples of such type of oil pump. This type of oil pump wherein the pressure of the working oil to be discharged from the low-pressure discharge passage is held at the above-indicated low level requires a relatively low driving torque, and accordingly improves fuel economy of a vehicle equipped with the oil pump.

The oil pump disclosed in the Patent Document 2 has an oil relief groove formed in the side surface of the pump chamber, for communication of the low-pressure discharge passage with a specific pressure chamber of the pressure chambers which is located between the openings of the high-pressure and low-pressure discharge passages and is not in communication with the discharge passages in the absence of the oil relief groove. The oil relief groove permits the working oil to flow from the specific pressure chamber into the low-pressure discharge passage, preventing an abrupt increase of the pressure of the working oil in the specific pressure chamber even when the specific pressure chamber is moved past the above-indicated location between the high-pressure and low-pressure discharge passages. Thus, the oil relief groove prevents an increase of the required pump drive torque due to the increase of the pressure of the working oil in the specific pressure chamber.

CITATION LIST

Patent Literature

PTL 1: JP-2009-068473 A
PTL 2: JP-2009-127569 A

SUMMARY OF INVENTION

Technical Problem

In the known oil pump described above, the working oil flows from the specific pressure chamber through the oil relief groove into the low-pressure discharge passage wherein the pressure of the working oil is held at the above-indicated low level, when the specific pressure chamber is moved past the above-indicated location between the high-pressure and low-pressure discharge passages. Consequently, the pressure of the working oil in the specific chamber is lowered down to a level close to the above-indicated low level, so that a pressure difference between the pressure of the working oil in the specific pressure chamber and the pressure of the working oil in the pressure chamber which is adjacent to the specific pressure chamber and which communicates with the high-pressure discharge passage increases, causing a leakage of the working oil from the high-pressure discharge passage into the specific pressure chamber through a small amount of clearance between the external and internal teeth of the driving and driven gears, and resulting in a decrease of the amount of discharge of the working oil from the high-pressure discharge passage.

In a vehicular power transmitting system including the known type of oil pump described above, and a continuously variable transmission operated with at least a portion of the working oil of the above-indicated relatively high pressure supplied from the oil pump, the above-described decrease of the amount of discharge of the working oil from the high-pressure discharge passage undesirably raises a lower limit of the rotating speed of an input shaft of the continuously variable transmission, above which the amount of consumption of the working oil of the above-indicated relatively high pressure can be afforded by only the amount of discharge of the working oil from the high-pressure discharge passage. Accordingly, the input shaft speed of the continuously variable transmission cannot be changed over a sufficiently broad range. In the vehicular power transmitting system, therefore, the pressure of the working oil discharged from the low-pressure discharge passage cannot be held at the above-indicated low level over a sufficiently broad range of the input shaft speed of the continuously variable transmission, giving rise to a problem that the required drive torque of the oil pump cannot be effectively reduced.

It is considered possible to provide the oil pump with an oil relief groove for communication of the specific pressure chamber with the high-pressure discharge passage to permit the working oil to flow from the specific oil chamber into the high-pressure discharge passage when the specific pressure chamber is moved past the above-indicated location between the high-pressure and low-pressure discharge passages and is not in communication with those discharge passages in the absence of the oil relief groove. Although this oil relief groove prevents the above-indicated oil leakage into the specific pressure chamber, the amount of consumption of the working oil of the relatively high pressure cannot be provided by the amount of discharge of the working oil from only the high-pressure discharge passage in a normal running state of the vehicle, and the pressure of the working oil to be discharged from the low-pressure discharge passage may not be held at the above-indicated low level, also giving rise to the problem that the required drive torque of the oil pump cannot be effectively reduced.

The present invention was made in view of the background art described above. It is an object of the present invention to provide a vehicular power transmitting system having an oil pump the required drive torque of which can be sufficiently reduced.

Solution to Problem

The object indicated above is achieved according to the principle of the present invention, which provides a power transmitting system of a vehicle, comprising: an oil pump of an internal contact gear type having a driving gear rotated about its axis by an engine, an annular driven gear having internal teeth meshing with external teeth of the driving gear and rotatable by the driving gear about an eccentric axis eccentric with respect to the axis of the driving gear, and a housing having a pump chamber accommodating the driving gear and the driven gear, and a high-pressure discharge passage and a low-pressure discharge passage which are open in a side surface of the pump chamber to discharge a working oil from the pump chamber such that the high-pressure discharge passage and the low-pressure discharge passage one after another communicate with a plurality of pressure chambers in the process of decrease of volume of each of the pressure chambers while the pressure chambers are moved in a direction of rotation of the driving and driven gears, the plurality of pressure chambers being formed between mutually meshing surfaces of the external and internal teeth such that the pressure chambers are spaced apart from each other in a circumferential direction of the driving and driven gears, the oil pump being operated such that a pressure of the working oil to be discharged from the low-pressure discharge passage is kept at a predetermined low level that is lower than a pressure of the working oil discharged from the high-pressure discharge passage by a predetermined amount, when an amount of consumption of the working oil of a relatively high pressure can be afforded by only an amount of discharge of the working oil from the high-pressure discharge passage; and a continuously variable transmission operable with at least a portion of the working oil of the above-indicated relatively high pressure, the power transmitting system being characterized in that the above-indicated amount of discharge of the working oil from said high-pressure discharge passage is determined such that the amount of consumption of the working oil of the relatively high pressure can be afforded by the amount of discharge of the working oil from the high-pressure discharge passage, during a steady-state running of the vehicle wherein an input shaft speed of the continuously variable transmission is not lower than a lowest target value predetermined for shifting control of the continuously variable transmission.

According to a first preferred form of the invention, the amount of discharge of the working oil from the above-indicated high-pressure discharge passage is determined to be larger than ½ of a total amount of discharge of the working oil from the high-pressure discharge passage and the above-indicated low-pressure discharge passage.

According to a second preferred form of the invention, the continuously variable transmission includes an input shaft and an output shaft which are disposed parallel to each other, a pair of variable-diameter pulleys respectively mounted on the input and output shafts, a transmission belt engaging V-grooves of the pair of variable-diameter pulleys, and a pair of hydraulic cylinders operated to act on the pair of variable-diameter pulleys for applying a tensioning force to the transmission belt respectively, and wherein the pair of hydraulic cylinders are operated with the working oil of the above-indicated relatively high pressure, to change effective diameters of the pair of variable-diameter pulleys for the transmission belt for continuously changing a speed ratio of the continuously variable transmission.

Advantageous Effects of Invention

In the power transmitting system of the vehicle according to the present invention, the amount of discharge of the working oil from the high-pressure discharge passage is determined such that the amount of consumption of the working oil of the relatively high pressure can be afforded by the amount of discharge of the working oil from the high-pressure discharge passage, during the steady-state running of the vehicle wherein the input shaft speed of the continuously variable transmission is not lower than the lowest target value predetermined for the shifting control of the continuously variable transmission, and wherein the engine speed is not lower than the predetermined threshold value corresponding to the lowest target input shaft speed. During the steady-state running of the vehicle, therefore, the amount of consumption of the working oil of the relatively high pressure can be afforded by the amount of discharge of the working oil from the high-pressure discharge passage, irrespective of the shifting state of the continuously variable transmission, so that the pressure of the working oil discharged from the low-pressure discharge passage can be kept at the above-indicated predetermined low level, and the required drive torque of the oil pump can be sufficiently reduced.

In the power transmitting system of the vehicle according to the first preferred form of this invention, the amount of discharge of the working oil from the high-pressure discharge passage is determined to be larger than ½ of the total amount of discharge of the working oil from the high-pressure and low-pressure discharge passages, so that the lower limit of the input shaft speed of the continuously variable transmission above which the amount of consumption of the working oil of the relatively high pressure can be afforded by only the amount of discharge of the working oil from the high-pressure discharge passage can be lowered as compared with that in the case where the amount of discharge from the high-pressure discharge passage is not larger than ½ of the total amount of discharge of the working oil from the high-pressure and low-pressure discharge passages. Accordingly, the pressure of the working oil discharged from the low-pressure discharge passage can be kept at the above-indicated predetermined low level in a wider range of the input shaft speed of the continuously variable transmission, making it possible to reduce the required drive torque of the oil pump.

In the vehicular power transmitting system of the vehicle according to the second preferred form of the invention, the continuously variable transmission includes the input shaft and output shaft which are disposed parallel to each other, the pair of variable-diameter pulleys respectively mounted on the input and output shafts, the transmission belt engaging the V-grooves of the pair of variable-diameter pulleys, and the pair of hydraulic cylinders operated to act on the pair of variable-diameter pulleys for applying the tensioning force to the transmission belt, and the pair of hydraulic cylinders are operated with the working oil of the above-indicated relatively high pressure, to change the effective diameters of the pair of variable-diameter pulleys for continuously changing the speed ratio of the continuously variable transmission.

During the steady-state running of the vehicle, the amount of consumption of the working oil of the above-indicated high pressure by the pair of hydraulic cylinders can be afforded by the amount of discharge of the working oil from high-pressure discharge passage, irrespective of the shifting state of the continuously variable transmission, so that the pressure of the working oil discharged from the low-pressure discharge passage can be kept at the predetermined low level, making it possible to sufficiently reduce the required drive torque of the oil pump.

DESCRIPTION OF EMBODIMENTS

The embodiment of this invention will be described in detail by reference to the drawings. It is to be understood that the drawings showing the embodiment described below are simplified or drawn schematically, and do not accurately represent the dimensions and shapes of the elements of the embodiment.

Figure 1:
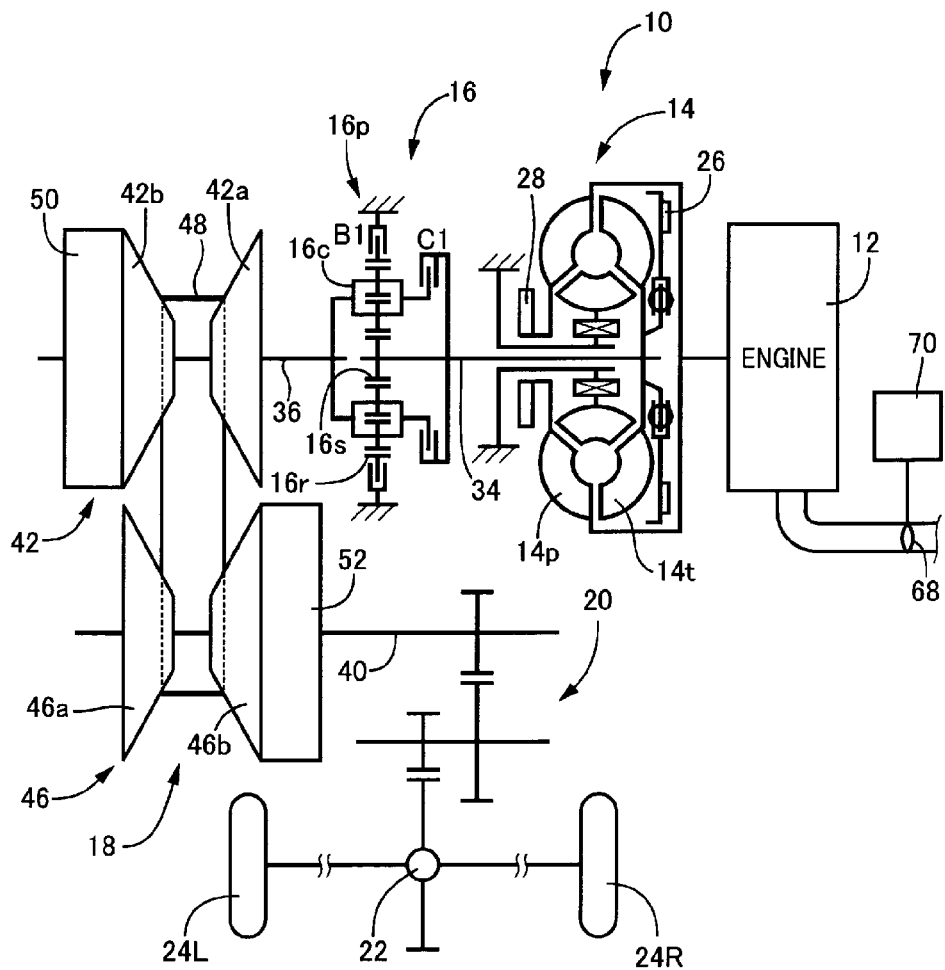
FIG. 1 is a schematic view showing an arrangement of a vehicular power transmitting system constructed according to one embodiment of this invention.

Referring to the schematic view of FIG. 1 showing the arrangement of a vehicular power transmitting system 10 constructed according to one embodiment of this invention, the vehicular power transmitting system 10 is constructed to be used for a FF (front-engine front-drive) vehicle, and is connected to an engine 12 provided as a drive power source of the vehicle. An output of the engine 12 which is an internal combustion engine is transmitted from a crankshaft of the engine 12 to a differential gear device 22 through a fluid-operated power transmitting device in the form of a torque converter 14, a forward-reverse switching device 16, a continuously variable transmission (CVT) of a belt type, and a speed reduction gear device 22, and is distributed to left and right drive wheels 24L and 24R.

The torque converter 14 includes a pump impeller 14p connected to the crankshaft of the engine 12, and a turbine impeller 14t connected to the forward-reverse switching device 16 through a turbine shaft 34, which is an output member of the torque converter 14. Between the pump impeller 14p and the turbine impeller 14t, there is disposed a lock-up clutch 26 which is engaged and released under the control of a lock-up clutch control valve which is incorporated within a hydraulic control unit 76 and which is constructed to control pressures of a working oil or fluid to be applied to an engaging pressure chamber and a releasing pressure chamber of the lock-up clutch 26. When the lock-up clutch 76 is placed in a fully engaged position, the pump and turbine impellers 14p, 14t are rotated as a unit. A mechanical oil pump 28 is connected to the pump impeller 14p, for performing a shifting control and a belt tension control of the continuously variable transmission 18. This oil pump 28 is operated in an operative relationship with the operation of the engine 12.

The torque converter 14 constructed as described above is operable in a lock-up control mode and a flex lock-up control mode in predetermined respective running states of the vehicle. For example, the torque converter 14 is operated in the lock-up control mode with the lock-up clutch 28 placed in the fully engaged state, wherein the pump and turbine impellers 14p and 14t are fully connected to each other and operated as a unit, and in the flex lock-up control mode with the lock-up clutch 18 placed in a partially engaged or slipping state, wherein in which the pump and turbine impellers 14p and 14t are partially connected to each other. The running states of the vehicle in which the torque converter 14 is operated in the respective lock-up control and flex lock-up control modes are defined as respective relationships between the operation amount of an accelerator pedal and a running speed of the vehicle.

The forward-reverse switching device 16 is principally constituted by a forward-drive clutch C1, a reverse-drive brake B1, a ring gear 16r, and a planetary gear device 16p of a double-pinion type. The planetary gear device 16 includes a sun gear 16s integrally connected to the turbine shaft 34, and a carrier 16c integrally connected to an input shaft 36 of the continuously variable transmission 18. The carrier 16c and the sun gear 16s are selectively connected to each other through the forward-drive clutch C1. The ring gear 16r is selectively fixed to a casing (not shown) of the vehicular power transmitting system 10. The forward-drive clutch C1 and the reverse-drive brake B1 are hydraulically operated frictional coupling devices which are frictionally engaged by respective actuators such as hydraulic cylinders. These forward-drive clutch C1 and reverse-drive brake B1 are engaged and released with a manual valve incorporated in the hydraulic control unit 76 shown in FIG. 2. The manual valve is constructed to control pressures of the working oil to be applied to the forward-drive clutch C1 and reverse-drive brake B1, for selectively engaging or releasing the clutch C1 and brake B1.

The forward-reverse switching device 16 constructed as described above is placed in a forward-drive position when the forward-drive clutch C1 is placed in its engaged state while the reverse-drive brake B1 is placed in its released state. In the forward-drive position, the forward-reverse switching device 16 is operated as a unit, and the turbine shaft 4 is directly connected to the input shaft 36, to establish a forward-drive-power transmitting path through which a forward drive force for running the vehicle in the forward direction is transmitted to the right and left drive wheels 24R, 24L. The forward-reverse switching device 16 is placed in a reverse-drive position when the reverse-drive brake B1 is placed in its engaged state while the forward-drive clutch C1 is placed in its released state. In the reverse-drive position, the input shaft 36 is rotated in a direction opposite to the direction of rotation of the turbine shaft 34, so that a reverse drive force for running the vehicle in the reverse direction is transmitted to the right and left drive wheels 24R, 24L. Further, the forward-reverse switching device 16 is placed in a neutral position (power disconnecting position) for disconnecting the power transmitting path, when the forward-drive clutch C1 and the reverse-drive brake B1 are both placed in the released position.

The continuously variable transmission 18 includes: an input shaft 36 and an output shaft 40 which are parallel to each other and each of which is rotatable about its axis; a driving variable-diameter pulley 42 mounted on the input shaft 36; a driven variable-diameter pulley 46 mounted on the output shaft 40; a transmission belt 48 engaging V-grooves of the variable-diameter pulleys 42, 46 to transmit a drive force between the variable-diameter pulleys 42, 46, with a friction force between the transmission belt 48 and the variable-diameter pulleys 42, 46; and a driving-side hydraulic cylinder 50 and a driven-side hydraulic cylinder 52 which produce thrust forces to change the widths of the V-grooves of the respective variable-diameter pulleys 42, 46, and a tensioning force acting on the transmission belt 48 in pressing contact with the variable-diameter pulleys 42, 46. The variable-diameter pulleys 42, 46 have respective stationary sheaves 42a, 46a fixed to the respective input and output shafts 36, 40, and respective movable sheaves 42b, 46b which are rotated together with the respective input and output shafts 36, 40 about their axes and which are axially movable relative to the respective input and output shafts 36, 40. The widths of the V-grooves of the variable-diameter pulleys 42, 46, which are defined by the stationary sheaves 42a, 46a and the movable sheaves 42b, 46b, are changed under the control of a shifting control solenoid-operated valve which is incorporated in the hydraulic control unit 76 shown in FIG. 2 and which is constructed to control the pressure of the working oil to be applied to the driving-side hydraulic cylinder 50. The tensioning force acting on the transmission belt 48 in pressing contact with the variable-diameter pulleys 42, 46 is adjusted under the control of a tension control solenoid-operated valve which is incorporated in the hydraulic control unit 76 and which is constructed to control the pressure of the working oil to be applied to the driven-side hydraulic cylinder 52.

The continuously variable transmission 18 constructed as described above has a speed ratio gamma (=rotating speed $N_{IN}$ of the input shaft 36/rotating speed $N_{OUT}$ of the output shaft 40), which is continuously variable with changes of the widths of the V-grooves of the driving-side and driven-side variable-diameter pulleys 42, 46 according to the running state of the vehicle, and consequent changes of the effective diameters of the variable-diameter pulleys 42, 46 at which the transmission belt 48 engages the V-grooves. The tensioning force acting on the transmission belt 48 in pressing contact with the variable-diameter pulleys 42, 46 is adjusted to prevent an amount of slipping of the transmission belt 48 with respect to the pulleys 42, 46.

Figure 2:
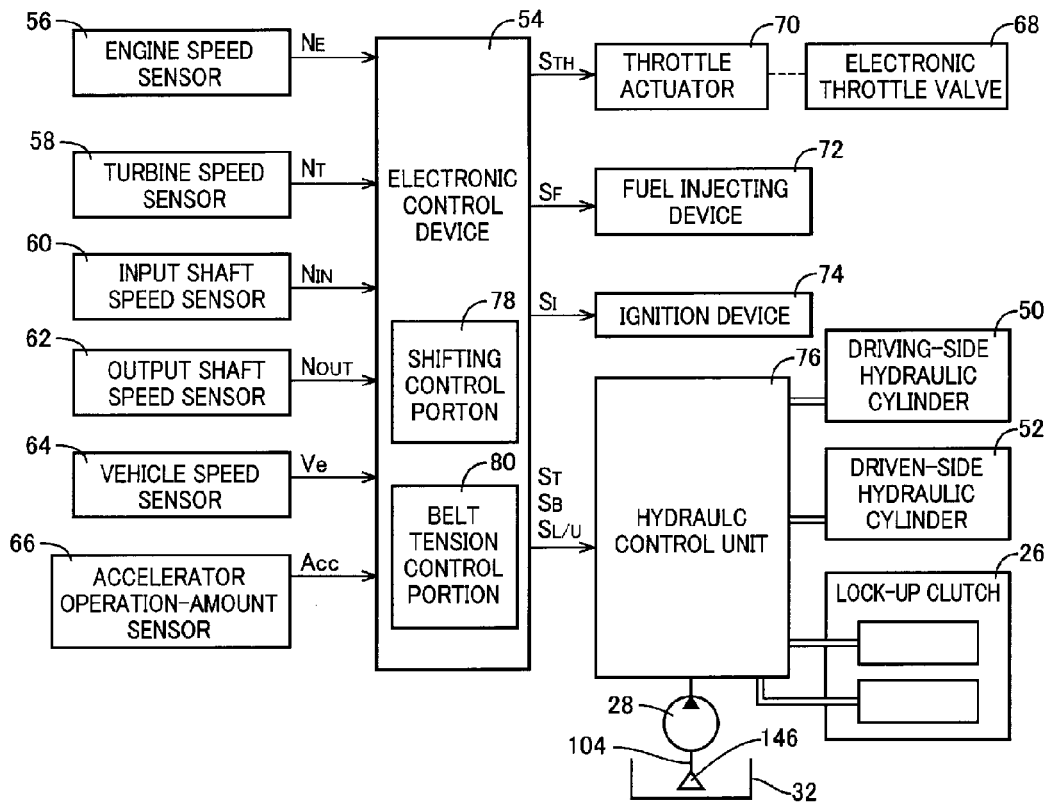
FIG. 2 is a block diagram showing major functions of a control system provided for controlling the vehicular power transmitting system of FIG. 1.

Referring next to the block diagram of FIG. 2 showing major functions of a control system provided for controlling the vehicular power transmitting system 10 of FIG. 1, the control system includes an electronic control device 54 which is principally constituted by a so-called microcomputer incorporating a CPU, a RAM, a ROM and an input-output interface. The CPU performs signal processing operations according to control programs stored in the ROM, while utilizing a temporary data storage function of the RAM, to implement an output control of the engine 12, the above-indicated shifting control and belt tension control of the continuously variable transmission 18, an engaging and releasing control of the lock-up clutch 26, and other controls. The electronic control device 54 have control divisions for respectively implementing the output control of the engine 12 and the hydraulic controls of the continuously variable transmission 18 and lock-up clutch 26.

The electronic control device 54 is configured to receive various signals including: an output signal of a engine speed sensor 56 indicative of an operating speed $N_E$ of the engine 12; an output signal of a turbine speed sensor 58 indicative of a rotating speed $N_T$ of the turbine shaft 34; an output signal of an input shaft speed sensor 60 indicative of a rotating speed $N_{IN}$ of the input shaft 36; an output signal of an output shaft speed sensor 62 indicative of a rotating speed $N_{OUT}$ of the output shaft 40; an output signal of a vehicle speed sensor 64 indicative of the running speed Ve of the vehicle; and an output signal of an accelerator operation-amount sensor 66 indicative of an operation amount $A_{CC}$ of the accelerator pedal.

The electronic control device 54 generates engine output control signals for controlling the output of the engine 12, such as a throttle signal $S_{TH}$ for driving a throttle actuator to open and close an electronic throttle actuator 68, a fuel injection signal $S_F$ for controlling an amount of injection of a fuel from a fuel injecting device 72, and an ignition timing signal $S_I$ for controlling the timing of ignition of the engine 12 by an igniting device 74. The electronic control device 54 further generates signals to be applied to the hydraulic control unit 76, such as a shifting control signal $S_T$ for driving the driving-side hydraulic cylinder 52 to control the speed ratio gamma of the continuously variable transmission 18, a tension control signal SB for driving the driven-side hydraulic cylinder 52 to control the tension of the transmission belt 48, and a lock-up-clutch control signal $S_{L/U}$ for engaging and releasing the lock-up clutch 26 and for controlling the amount of slipping of the lock-up clutch 26.

The electronic control device 54 includes various functional portions including a shifting control portion 78 and a belt tension control portion 80, which will be described in detail.

Figure 3:
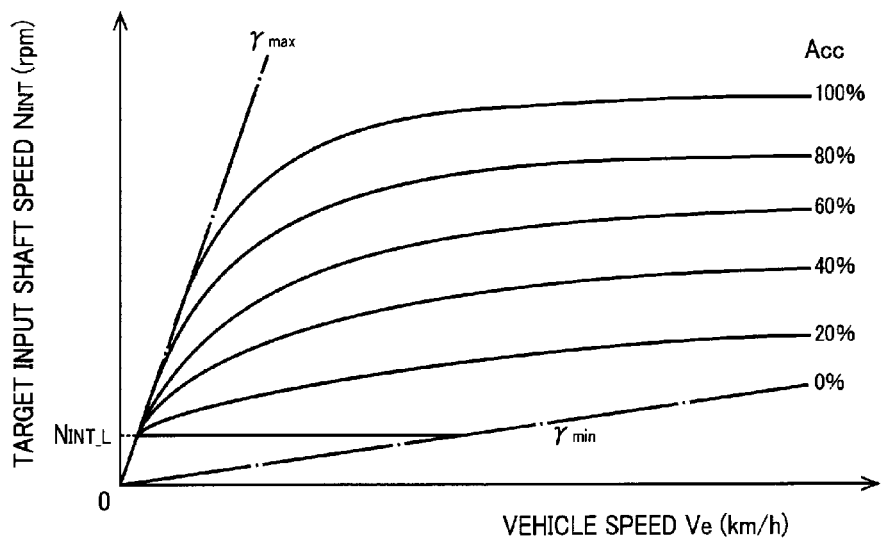
FIG. 3 is a view illustrating a shifting map which represents a predetermined and stored relationship among an operation amount of an accelerator pedal used as a vehicle operator's required amount of vehicle output, a running speed of a vehicle, and a target input shaft speed of the power transmitting system.

The shifting control portion 78 is configured to calculate a target speed $N_{INT}$ of the input shaft 36 on the basis of the operation amount $A_{CC}$ of the accelerator pedal and the vehicle running speed Ve, and according to a shifting map (shown in FIG. 3 by way of example) which represents a predetermined and stored relationship among the operation amount $A_{CC}$ of the accelerator pedal used as a vehicle operator's required amount of vehicle output, the vehicle running speed Ve, and the target input shaft speed $N_{INT}$. Then, the shifting control portion 78 implements the shifting control to change the speed ratio gamma of the continuously variable transmission 18 according to an error between the actual input shaft speed $N_{IN}$ and the target input shaft speed $N_{INT}$, so that the actual input shaft speed $N_{IN}$ coincides with the target input shaft speed $N_{INT}$. Described in more detail, the shifting control portion 78 implements a feedback control of the above-described shifting control solenoid-operated valve to control a rate of flow of the working oil into the driving-side hydraulic cylinder 50, for changing the widths of the V-grooves of the driving and driven variable-diameter pulleys 42, 46 to thereby change the effective diameters of the pulleys 42, 46 engaging the transmission belt 48, for changing the speed ratio gamma of the continuously variable transmission 18. The shifting map shown in FIG. 3, which corresponds to a shifting condition of the continuously variable transmission 48, is formulated to determine the target input shaft speed $N_{INT}$ such that the speed ratio gamma increases with a decrease of the vehicle running speed Ve and with an increase of the operation amount $A_{CC}$ of the accelerator pedal. It is noted that a lowest target input shaft speed $N_{INTL}$ indicated in FIG. 3 is the minimum value of the target value of the input shaft speed NIN, which is used by the shifting control portion 78 for the shifting control. For example, the lowest target input shaft speed $N_{INTL}$ is set to be about 900-1000 rpm. The continuously variable transmission 18 is shifted to control the input shaft speed NIN such that the input shaft speed NIN is not lower than the lowest target input shaft speed $N_{INTL}$.

Referring back to FIG. 2, the belt tension control portion 80 is configured to calculate a target belt tensioning force $F_T$ on the basis of the operation amount $A_{CC}$ of the accelerator pedal and the speed ratio gamma, and according to a belt tensioning map which represents a predetermined and stored relationship among the operation amount $A_{CC}$ of the accelerator pedal, the speed ratio gamma, and the target belt tensioning force $F_T$. Then, the belt tension control portion 80 implements the belt tension control to control an actual tensioning force F of the transmission belt 48 such that the actual belt tensioning force F coincides with the target belt tensioning force $F_T$. Described in more detail, the belt tension control portion 80 implements a feedback control of the above-described tension control solenoid-operated valve to control a rate of flow of the working oil into the driven-side hydraulic cylinder 52, for adjusting the belt tensioning force F. The belt tensioning map represents a stored relationship among the belt tensioning force F, accelerator pedal operation amount $A_{CC}$ and speed ratio gamma, which relationship is predetermined by experimentation such that the transmission belt 48 does not slip on the variable-diameter pulleys 42, 46.

Figure 4:
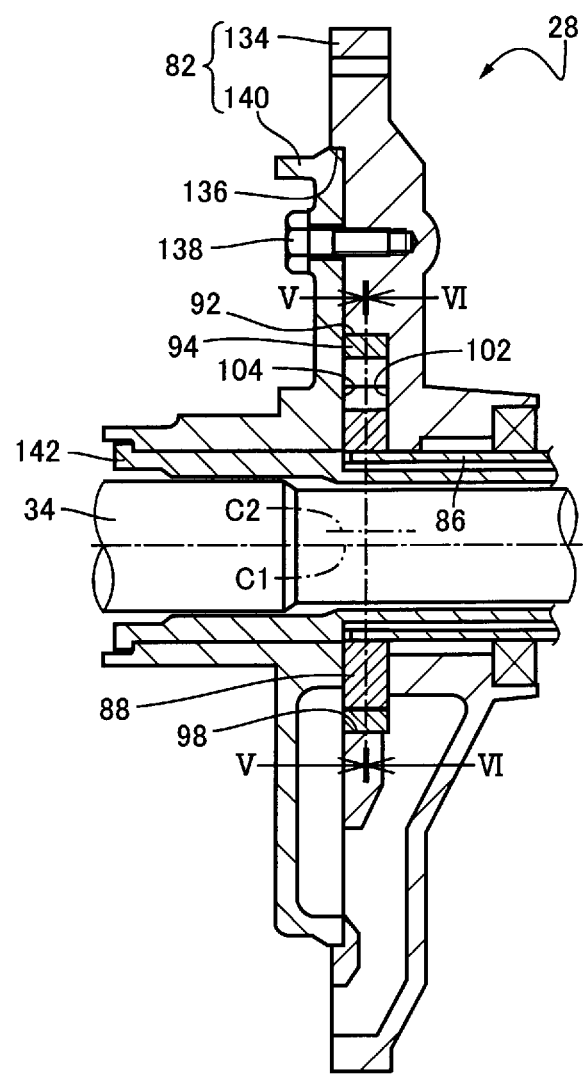
FIG. 4 is a cross sectional view of an oil pump provided in the vehicular power transmitting system.
Figure 5:
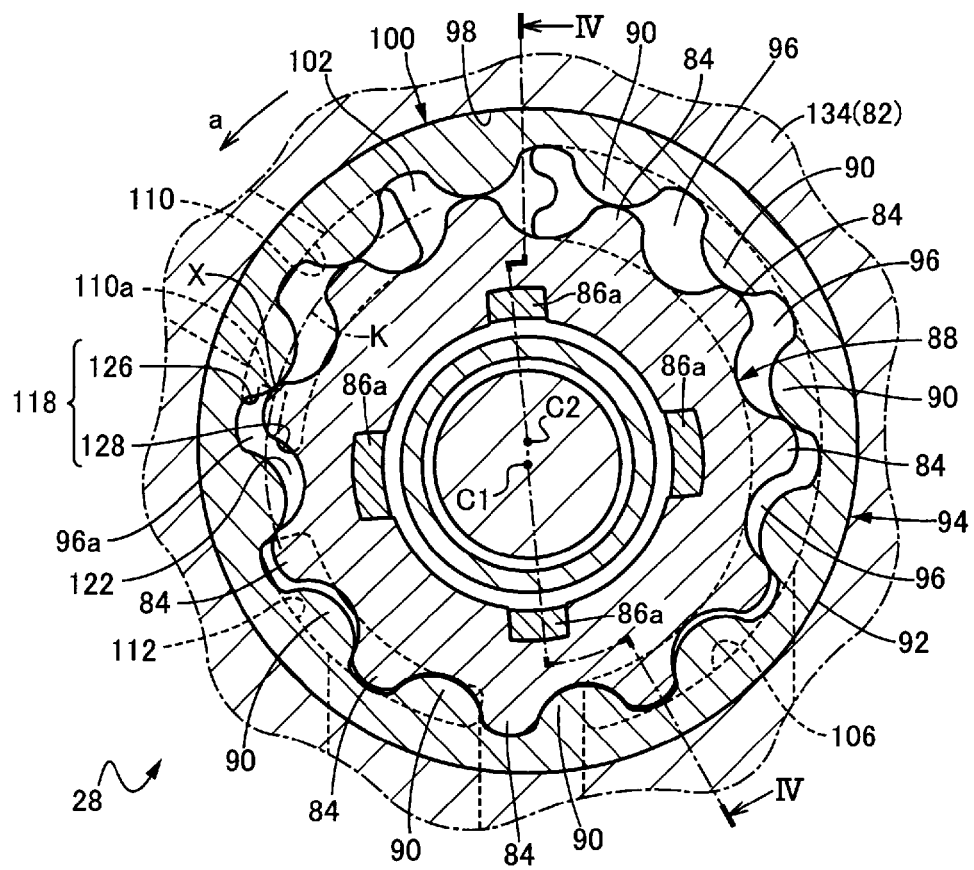
FIG. 5 is a cross sectional view taken along arrow-headed lines V-V in FIG. 4.
Figure 6:
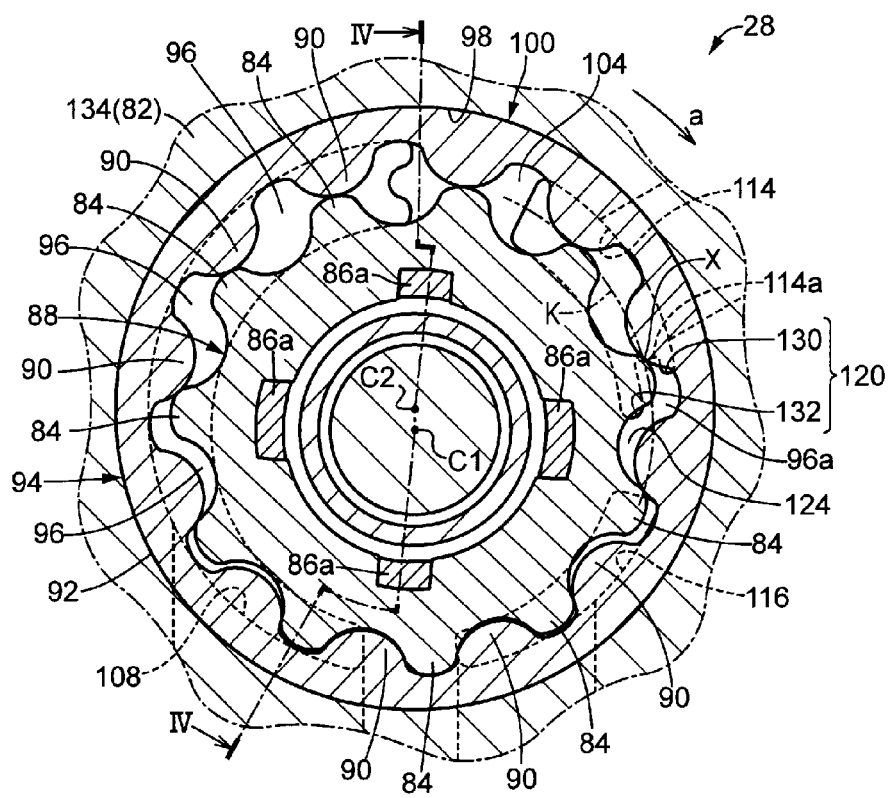
FIG. 6 is a cross sectional view taken along arrow-headed lines VI-VI in FIG. 4.

The oil pump 28 constructed according to the present embodiment of the invention will be described in detail, by reference to the cross sectional view of FIG. 4, the cross sectional view of FIG. 5 taken along arrow-headed lines V-V in FIG. 4, and the cross sectional view of FIG. 6 taken along arrow-headed lines VI-VI in FIG. 4. As shown in FIGS. 4-6, the oil pump 28 is of a so-called internal contact gear pump type having a housing 82, a driving gear 88 and an annular driven gear 94. The housing 82 is fixed to a portion of the casing (not shown) of the vehicular power transmitting system 10, which portion is located between the torque converter 14 and the forward-reverse switching device 16. The driving gear 88 has eleven (11) external teeth 84, and engages a plurality of tooth portions 86a formed on one end portion of a pump shaft 86 in the form of a sleeve having an axis C1 extending from a radially inner end portion of the pump impeller 14p. The driving gear 88 is accommodated in the housing 82 such that the driving gear 88 is rotatable with the pump shaft 86 about the axis C1. The annular driven gear 94 has twelve (12) internal teeth 90 meshing with the external teeth 84, and an outer circumferential surface 92, and is accommodated in the housing 82 such that the driven gear 94 is rotatable about an eccentric axis C2 which is eccentric with respect to the axis C1. The driven gear 94 is rotated by the driving gear 88.

As shown in FIG. 5, the external teeth 84 of the driving gear 88 and the internal teeth 90 of the driven gear 94 come into meshing engagement with each other, in a relatively lower circumferential portion of the oil pump 28 as seen in FIG. 5. The driving gear 88 is rotated by the pump shaft 86 about the axis C1 in a direction indicated by an arrow-headed line "a" in FIG. 5, while the driven gear 94 is rotated by the driving gear 88 about the eccentric axis C2 in the direction indicated by the arrow-headed line "a" in FIG. 5. As the driving gear 88 and driven gear 94 are rotated, the external teeth 84 are moved in the direction of rotation of the gears 88, 94 at a speed higher than the internal teeth 90, in sliding contact or extremely slightly spaced-apart relationship with the internal teeth 90 forwardly adjacent to the external teeth 84 as seen in the direction of rotation. Each of the external teeth 84 which has meshed with one of the internal teeth 90 in the lower circumferential portion of the oil pump 28 comes into meshing engagement with the next one of the internal teeth 90 forwardly adjacent to the above-indicated one internal tooth 90 as seen in the direction of rotation.

Figure 7:
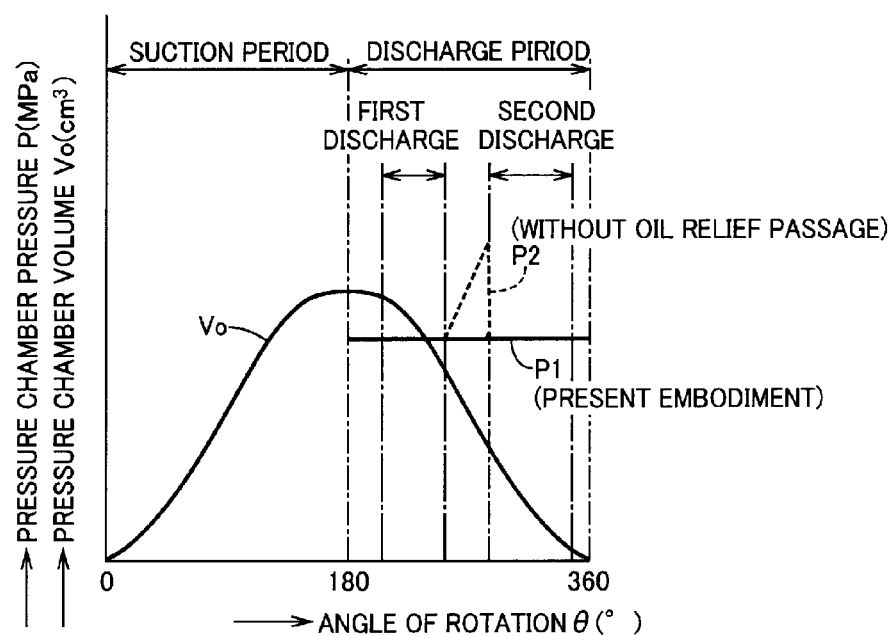
FIG. 7 is a view indicating a relationship between an angle of rotation of each pressure chamber of the oil pump about the axis of the oil pump, and a volume of the pressure chamber.

As shown in FIGS. 5 and 6, a plurality of (eleven in the present embodiment) pressure chambers 96 are formed between mutually meshing surfaces of the external and internal teeth 84, 90 such that the pressure chambers 96 are spaced apart from each other in the circumferential direction of the driving and driven gears 88, 94. These pressure chambers 96 are moved in the direction of rotation of the driving and driven gears 88, 94 as the driving and driven gears 88, 94 are rotated. FIG. 7 is a view indicating a relationship between an angle of rotation (rotary movement) q of the pressure chambers 96 about the axis C1, and a volume Vo of each pressure chamber 96. In FIG. 7, the angle of rotation 0 degree (360 degree) of the pressure chambers 96 taken along the horizontal axis corresponds to the mutually meshing external and internal teeth 84, 90 located at the lowest circumferential position of the oil pump 28 as seen in FIG. 5. As indicated in FIG. 7, the volume Vo of each pressure chamber 96 increases from zero up to the maximum value as the angle of rotation q of the pressure chamber 96 increases from 0 degree to 180 degree, and decreases from the maximum value down to zero as the angle of rotation q decreases from 180 degree to 360 degree.

The housing 82 accommodating the driving gear 88 and driven gear 94 has: a pump chamber 100 having an inner circumferential surface 100 in contact with the outer circumferential surface 92 of the driven gear 94; a first suction passage 106 open in one side surface 102 (shown in FIGS. 4 and 5) of the pump chamber 100 on the side of the torque converter 14, for sucking the working oil into the pump chamber 100; a second suction passage 108 open in another side surface 104 (shown in FIGS. 4 and 6) of the pump chamber 100 on the side of the forward-reverse switching device 16, for sucking the working oil into the pump chamber 100; a first high-pressure discharge passage 110 and a first low-pressure discharge passage 112 which are open in the side surface 102 of the pump chamber 100, for discharging the working oil from the pump chamber 100, and which are spaced apart from each other in the circumferential direction of the pump chamber 100, as shown in FIG. 5; a second high-pressure discharge passage 114 and a second low-pressure discharge passage 116 which are open in the side surface 104 of the pump chamber 100, for discharging the working oil from the pump chamber 100, and which are spaced apart from each other in the circumferential direction of the pump chamber 100, as shown in FIG. 6. The edges of openings of the passages 106, 108, 110, 112, 114, 116 are indicated by broken lines in FIGS. 5 and 6.

The first suction passage 106 and the second suction passage 108 are held open to the pump chamber 100 in a selected portion of the circumference of the pump chamber 100 in which the volume Vo of each pressure chamber 96 increases during rotation of the driving and driven gears 88, 94, namely, in a selected portion of a suction period corresponding to a range from 0 degree to 180 degree of the angle of rotation q of each pressure chamber 96, for example, in a portion of the suction period corresponding to a range from 12 degree to 178 degree. Accordingly, the first and second suction passages 106, 108 are held in communication with the pressure chambers 96 in a period of increase of the volume Vo of each pressure chamber 96 while the pressure chamber 96 is moved in the direction of rotation of the driving and driven gears 88, 94.

The first high-pressure discharge passage 110 and the second high-pressure discharge passage 114 are held open to the pump chamber 1 in a selected portion of the circumference of the pump chamber 100 in which the volume Vo of each pressure chamber 96 decreases during rotation of the driving and driven gears 88, 94, namely, in a selected portion of a discharge period corresponding to a range from 180 degree to 360 degree of the angle of rotation q of each pressure chamber 96, for example, for a first discharge period corresponding to a range from 205 degree to 252 degree. Accordingly, the first and second high-pressure discharge passages 110, 114 are held in communication with the pressure chambers 96 in a first half of a period of decrease of the volume Vo of each pressure chamber 96 while the pressure chamber 96 is moved in the direction of rotation of the driving and driven gears 88, 94.

The second low-pressure discharge passage 112 and the second low-pressure discharge passage 116 are held open to the pump chamber 100 in a selected portion of the circumference of the pump chamber 100 in which the volume Vo of each pressure chamber 96 decreases during rotation of the driving and driven gears 88, 94, namely, in another selected portion of the discharge period corresponding to the range from 180 degree to 360 degree of the angle of rotation q of each pressure chamber 96, for example, for a second discharge period corresponding to a range from 285 degree to 347 degree. Accordingly, the first and second low-pressure discharge passages 112, 116 are held in communication with the pressure chambers 96 in a second half of the period of decrease of the volume Vo of each pressure chamber 96 while the pressure chamber 96 is moved in the direction of rotation of the driving and driven gears 88, 94.

The first high-pressure discharge passage 110 and the second high-pressure discharge passage 114 are respectively located upstream of the first low-pressure discharge passage 112 and the second low-pressure discharge passage 116. The first high-pressure and low-pressure discharge passages 110, 112 are not held in communication with each other, to prevent reduction of volume efficiency on the high-pressure side. Described in detail, the first high-pressure and low-pressure discharge passages 110, 112 are arranged such that each pressure chamber 96 moved in the direction of rotation of the driving and driven gears 88, 94 first comes into communication with only the first high-pressure discharge passage 110, and then comes into communication with only the first low-pressure discharge passage 112 after the communication of the pressure chamber 96 with both of the first high-pressure and low-pressure discharge passages 110, 112 is inhibited. This arrangement applies to the second high-pressure and low-pressure discharge passages 114, 116.

The housing 82 has a first oil relief passage 118 and a second oil relief passage 120 which are formed in the respective side surfaces 102, 104 of the pump chamber 100, for communication of a specific pressure chamber 96a of the plurality of pressure chambers 96 with the first high-pressure discharge passage 110 and the second high-pressure discharge passage 114, when the entirety of the specific pressure chamber 96a is located between the openings of the first and second high-pressure discharge passages 110, 114 and the openings of the first and second low-pressure discharge passages 112, 116 and is not in communication with those high-pressure and low-pressure discharge passages 110, 114, 112, 116 in the absence of the oil relief passages 118, 120. The specific pressure chamber 96a is one of the pressure chambers 96 which is fluid-tightly formed between a wall surface 122 (shown in FIG. 5) between the openings of the first high-pressure and low-pressure discharge passages 110, 112, and a wall surface 124 (shown in FIG. 6) between the openings of the second high-pressure and low-pressure discharge passages 114, 116, as seen in the direction parallel to the axis C1.

As shown in FIG. 5, the first oil relief passage 118 consists of a first outer circumferential groove 126 and a first inner circumferential groove 128. The first outer circumferential groove 126 is formed so as to extend from a part of a forward end 110a (as seen in the direction of rotation of the gears 88, 94) of the first high-pressure discharge passage 110, which part is radially outside of a circular locus K of a point of mutual proximity or contact X of the mutually meshing external tooth 84 and internal tooth 90 which define therebetween the specific pressure chamber 96a the entirety of which is located between the first high-pressure and low-pressure discharge passages 110, 112. The first outer circumferential groove 126 extends from the above-indicated part of the downstream end 110a in the direction of rotation of the gears 88, 94 and is held in communication at its forward end with the specific pressure chamber 96a. The first inner circumferential groove 128 is formed so as to extend from a part of the forward end 110a of the first high-pressure discharge passage 110, which part is radially inside of the circular locus K. The first inner circumferential groove 128 extends from the above-indicated part of the forward end 110a in the direction of rotation of the gears 88, 94 and is held in communication at its forward end with the specific pressure chamber 96a.

As shown in FIG. 6, the second oil relief passage 120 consists of a second outer circumferential groove 130 and a second inner circumferential groove 132. The second outer circumferential groove 130 is formed so as to extend from a part of a forward end 114a (as seen in the direction of rotation of the gears 88, 94) of the second high-pressure discharge passage 114, which part is radially outside of the circular locus K of the point of mutual contact X of the mutually meshing external tooth 84 and internal tooth 90 which define therebetween the specific pressure chamber 96a the entirety of which is located between the second high-pressure and low-pressure discharge passages 114, 116. The second outer circumferential groove 130 extends from the above-indicated part of the forward end 114a in the direction of rotation of the gears 88, 94 and is held in communication at its forward end with the specific pressure chamber 96a. The second inner circumferential groove 132 is formed so as to extend from a part of the forward end 114a of the second high-pressure discharge passage 114, which part is radially inside of the circular locus K. The second inner circumferential groove 132 extends from the above-indicated part of the forward end 114a in the direction of rotation of the gears 88, 94 and is held in communication at its forward end with the specific pressure chamber 96a.

As shown in FIG. 4, the housing 82 consists of a pump body 134 in the form of a disc, and a pump covering 140 fitted in a shallow fitting hole 136 of a relatively large diameter formed in a side surface of the pump body 134 on the side of the forward-reverse switching device 16. The pump covering 140 is fixed to the pump body 134 with a plurality of screws 138. The inner circumferential surface 98 described above is an inner circumferential surface of a cylindrical hole formed in the bottom surface of the fitting hole 136. The side surface 102 of the pump chamber 100 is the bottom surface of the above-indicated cylindrical hole, while the side surface 104 of the pump chamber 100 is an end face of the pump covering 140 on the side of the pump body 134. The pump chamber 100 is defined by and between the above-indicated cylindrical hole and the end face of the pump covering 140 on the side of the pump body 134. The pump covering 140 has an inner circumferential surface in which one end portion of a stator shaft 142 of the torque converter 14 is integrally fitted. The stator shaft 142 is connected at its other end portion to the stator shaft 142. The turbine shaft 34 extends through the stator shaft 142. As shown in FIGS. 5 and 6, the first suction passage 106, first high-pressure discharge passage 110 and first low-pressure discharge passage 112 are formed through the pump body 134, while the second suction passage 108, second high-pressure discharge passage 114 and second low-pressure discharge passage 116 are formed through the pump covering 140.

Figure 8:
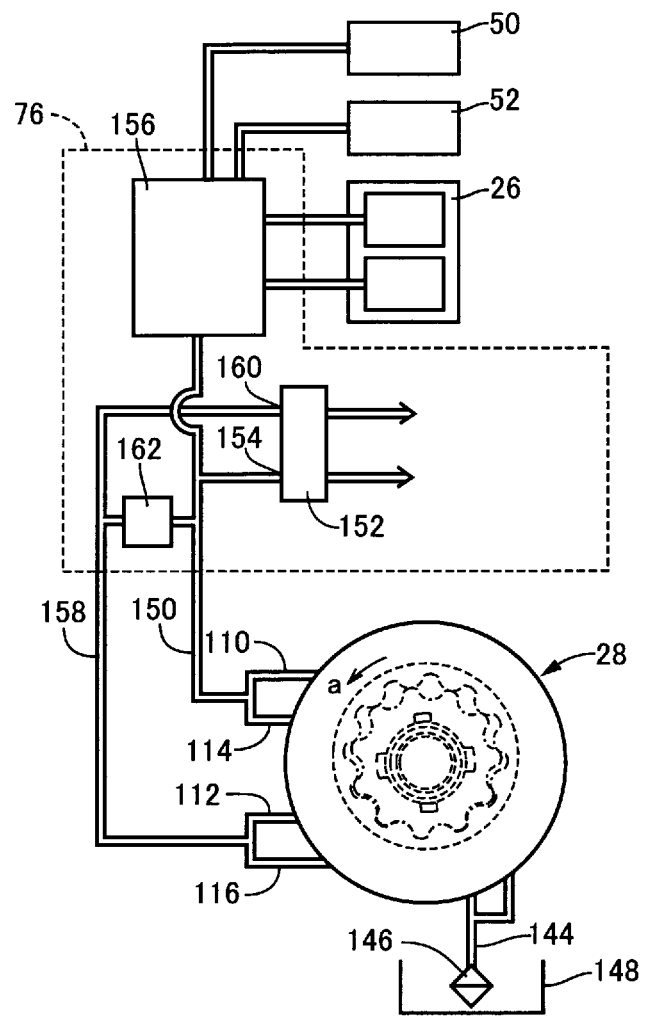
FIG. 8 is a view schematically showing the oil pump and a portion of a hydraulic control unit of the power transmitting system.

Referring to FIG. 8 schematically showing the oil pump 28 and a portion of the hydraulic control unit 76, the first and second suction passages 106, 108 of the oil pump 28 which are connected to each other are held in communication with an oil storage space formed in an oil pan 148 fixed to a lower portion of the casing of the power transmitting system 10, through a first oil passage 144 formed through the above-indicated casing, and a strainer 146. The first and second high-pressure discharge passages 110, 114 of the oil pump 28 which are connected to each other are connected, through a second oil passage 150 formed the above-indicated casing, to a first input port 154 of a relief type regulator 152 well known in the art, which is incorporated in the hydraulic control unit 76. The first and second high-pressure discharge passages 110, 114 are further connected to a valve device 156 which incorporates the above-described manual valve, shifting control solenoid-operated valve, tension control solenoid-operated valve, etc. The first and second low-pressure discharge passages 112, 116 of the oil pump 28 which are connected to each other are connected to a second input port 160 of the regulator 152 in the hydraulic control unit 76, through a third oil passage 158 formed through the above-indicated casing.

The pressure of the working oil to be supplied to the valve device 156 is adjusted by the regulator 152, which regulates an amount of relief flow of the working oil from the regulator 152. Described in detail, a high-pressure-port pressure value Pp1 of the working oil discharged from the high-pressure discharge passages 110, 114 is not higher than a predetermined upper limit Pphigh while the engine speed $N_E$ is not higher than a predetermined threshold value $N_{E1}$ during a steady-state running of the vehicle, as indicated in the lower portion of the graph of FIG. 9. In this case, there is no relief flow of the working oil from the regulator 152, and the working oil of the high-pressure-port pressure value Pp1 not higher than the upper limit Pphigh is supplied to the valve device 156. While the engine speed $N_E$ is higher than the threshold value $N_{E1}$, the high-pressure-port pressure value Pp1 becomes higher than the upper limit Pphigh. In this case, the regulator 152 lowers the high-pressure-port pressure value Pp1 down to the upper limit Pphigh. The upper portion of the graph of FIG. 9 indicates amounts Q of discharge of the working oil from the discharge passages 110, 112, 114, 116. The total amount of discharge from the first and second high-pressure discharge passages 110, 114, that is, a high-pressure-port discharge amount Q1, and the total amount of discharge from the first and second low-pressure discharge passages 112, 116, that is, a low-pressure-port discharge amount Q2 are proportional to the engine speed $N_E$.

The high-pressure-port discharge amount Q1 of the first and second high-pressure discharge passages 110, 114 is determined such that an amount Q' of consumption of the working oil of a relatively high pressure (upper limit pressure value Pphigh) by the valve device 156 can be afforded by only the high-pressure-port discharge amount Q1 of the first and second high-pressure discharge passages 110, 114, during the steady-state running of the vehicle wherein the input shaft speed $N_{IN}$ of the continuously variable transmission 18 is not lower than the lowest target input shaft speed $N_{INT\,L}$ predetermined by the shifting control portion 78 for the shifting control of the continuously variable transmission 18, and wherein the engine speed $N_E$ is not lower than a predetermined threshold value $N_{E2}$ corresponding to the lowest target input shaft speed $N_{INT\,L}$. Described in detail, an angle of opening (a circumferential length) of the first and second high-pressure discharge passages 110, 114 in the circumferential direction of the oil pump 18, and an angle of opening (a circumferential length) of the first and second low-pressure discharge passages 112, 116 in the circumferential direction are determined by experimentation such that the amount Q' of consumption of the relatively high pressure can be afforded by only the high-pressure-port discharge amount Q1 of the first and second high-pressure discharge passages 110, 114 during the steady-state running of the vehicle on a flat roadway at a constant speed, with the engine speed $N_E$ being not lower than the threshold value $N_{E2}$. In the present embodiment of the invention, the high-pressure-port discharge amount Q1 is determined to be larger than ½ of the total amount of the high-pressure-port discharge amount Q1 and the low-pressure-port discharge amount Q2. Namely, as indicated in FIG. 9, the high-pressure-port discharge amount Q1 ($N_{E2}$) is larger than the total discharge amount Q1($N_{E2}$)+Q2 ($N_{E2}$).

Figure 9:
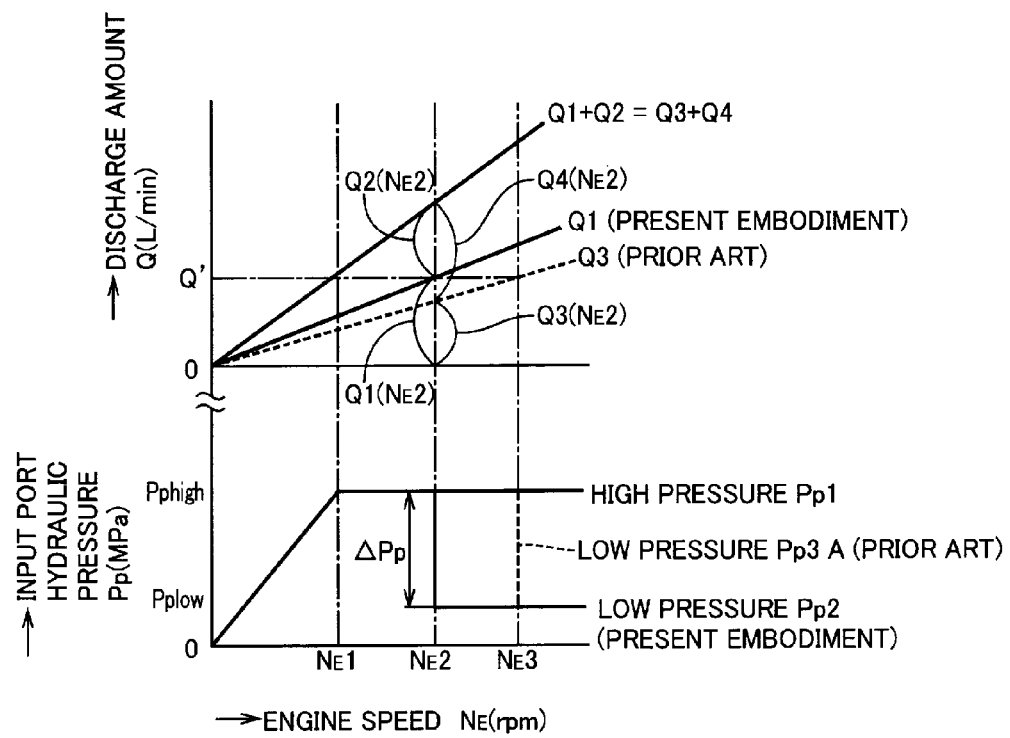
FIG. 9 is a view indicating a relationship among an amount of oil discharge from the oil pump, a hydraulic pressure value at a port of the oil pump, and an operating speed of an engine.

During the steady-state running of the vehicle wherein the input shaft speed $N_{IN}$ is lower than the above-indicated lowest target input shaft speed $N_{INT\,L}$, and the engine speed $N_E$ is lower than the threshold value $N_{E2}$, as indicated in the lower portion of the graph of FIG. 9, the pressure of the working oil supplied from the first and second low-pressure discharge passages 112, 116 to the third oil passage 158 is raised by closing of the second input port 160 of the regulator 152, to be higher than the pressure of the working oil in the second oil passage 150, so that the working oil flows from the third oil passage 158 to the second oil passage 150 through a one-way valve 162.

During the steady-state running of the vehicle wherein the input shaft speed $N_{IN}$ is not lower than the above-indicated lowest target input shaft speed $N_{INT\,L}$, and the engine speed $N_E$ is not lower than the threshold value $N_{E2}$, as indicated in the lower portion of the graph of FIG. 9, the pressure of the working oil supplied from the first and second low-pressure discharge passages 112, 116 to the third oil passage 158 is kept at a predetermined low level Pplow by another regulator not shown. In the oil pump 28 according to the present embodiment, therefore, a low-pressure-port pressure value Pp2 of the working oil discharged from the first and second low-pressure discharge passages 112, 116 is kept at the low level Pplow which is lower by a predetermined amount delta Pp than the high-pressure-port pressure value Pp1 of the working oil discharged from the first and second high-pressure discharge passages 110, 114, when the amount Q' of consumption of the working oil of the relatively high pressure by the valve device 156 can be afforded by only the high-pressure-port discharge amount Q1 of the first and second high-pressure discharge passages 110, 114.

In the oil pump 28 constructed as described above, the working oil accommodated in the oil pan 148 is sucked through the strainer 146 and the first oil passage 144 into those ones of the pressure chambers 96 which are moved in a portion of the circumference of the pump chamber 100 in which the volume V of the pressure chambers 96 increases, while the driving and driven gears 88, 94 are rotated in the above-indicated predetermined direction. The working oil sucked into the above-indicated pressure chambers 96 is pressurized while those pressure chambers 96 are then moved in the following portion of the circumference of the pump chamber 100 in which the volume V decreases. The thus pressurized working oil is discharged from the specific pressure chamber 96a communicating with the first and second discharge passages 110, 112, and fed into the hydraulic control unit 76 through those discharge passages 110, 114 and the second oil passage 150. The sucked and pressurized working oil is also discharged from the pressure chamber 96 communicating with the first and second low-pressure discharge passages 112, 116, and fed into the hydraulic control unit 76 through those discharge passages 112, 116 and the third oil passage 158.

During the steady-state running of the vehicle, the input shaft speed $N_{IN}$ is higher than the above-indicated lowest target input shaft speed $N_{INT\,L}$, irrespective of the shifting state of the continuously variable transmission 18, and the engine speed $N_E$ becomes higher than the threshold value $N_{E2}$, so that the amount Q' of consumption of the working oil of the relatively high pressure by the valve device 156 can be afforded by only the high-pressure-port discharge amount Q1, whereby the low-pressure-port pressure value Pp2 of the working oil discharged from the first and second low-pressure discharge passages 112, 116 is kept at the predetermined low level Pplow.

In the known oil pump, a high-pressure-port discharge amount Q3 is smaller than a total amount of the high-pressure-port discharge amount Q3 and a low-pressure-port discharge amount Q4, as indicated in the upper portion of the graph of FIG. 9. During the steady-state running of the vehicle, the amount Q' of consumption of the working oil of the relatively high pressure by the valve device 156 can be afforded by only the high-pressure-port discharge amount Q3 when the engine speed $N_E$ is not lower than a threshold value $N_{E3}$ higher than the above-indicated threshold value $N_{E2}$. In some shifting state of the continuously variable transmission 18, therefore, the engine speed NE becomes lower than the threshold value NE3, and the amount Q' of consumption of the relatively high pressure by the valve device 156 cannot be afforded by only the high-pressure-port discharge amount Q3, and the a low-pressure-port pressure value Pp3 of the working oil discharged from the first and second low-pressure discharge passages 112, 116 may not be kept at the predetermined low level, giving rise to a problem that the required drive torque of the oil pump cannot be sufficiently reduced.

In the oil pump 28 provided in the vehicular power transmitting system 10 according to the present embodiment described above, the amount of discharge of the working oil from the first and second high-pressure discharge passages 110, 114 (the high-pressure-port discharge amount Q1) is determined such that the amount Q' of consumption of the working oil of the relatively high pressure can be afforded by the high-pressure-port discharge amount Q1, during the steady-state running of the vehicle wherein the input shaft speed $N_{IN}$ of the continuously variable transmission 18 is not lower than the lowest target input shaft speed $N_{INT\,L}$ predetermined for the shifting control of the continuously variable transmission 18, and wherein the engine speed $N_E$ is not lower than the predetermined threshold value $N_{E2}$ corresponding to the lowest target input shaft speed $N_{INT\,L}$. During the steady-state running of the vehicle, therefore, the amount of consumption of the working oil of the relatively high pressure can be afforded by the high-pressure-port discharge amount Q1, irrespective of the shifting state of the continuously variable transmission 18, so that the pressure of the working oil discharged from the first and second low-pressure discharge passages 112, 116 (low-pressure-port pressure value Pp2) can be kept at the predetermined low level, and the required drive torque of the oil pump 28 can be sufficiently reduced.

In the oil pump 28 of the vehicular power transmitting system 10 according to the present embodiment, the high-pressure-port discharge amount Q1 is determined to be larger than ½ of the total amount of the high-pressure-port discharge amount Q1 and the low-pressure-port discharge amount Q2, so that the lower limit of the input shaft speed of the continuously variable transmission 18 above which the amount Q' of consumption of the working oil of the relatively high pressure can be afforded by only the high-pressure-port discharge amount Q1 can be lowered as compared with that in the case where the high-pressure-port discharge amount Q1 is not larger than ½ of the total amount of Q1 and Q2. Accordingly, the pressure of the working oil discharged from the first and second low-pressure discharge passages 112, 116 can be kept at the predetermined low level in a wider range of the input shaft speed of the continuously variable transmission 18, making it possible to reduce the required drive torque of the oil pump 28.

In the vehicular power transmitting system 10 according to the present embodiment, the continuously variable transmission 18 includes the input shaft 36 and the output shaft 40 which are disposed parallel to each other, the driving variable-diameter pulley 42 mounted on the input shaft 36, the driven variable-diameter pulley 46 mounted on the output shaft 40, the transmission belt 48 engaging the V-grooves of the pair of variable-diameter pulleys 42, 46, and the driving-side and driven-side hydraulic cylinders 50, 52 operated to act on the pair of variable-diameter pulleys 42, 46 for applying a tensioning force to the transmission belt 48, and the pair of hydraulic cylinders 50, 52 are operated with the working oil of the above-indicated relatively high pressure, to change the effective diameters of the pair of variable-diameter pulleys 43, 46 for continuously changing the speed ratio gamma of the continuously variable transmission 18. During the steady-state running of the vehicle, the amount Q' of consumption of the working oil of the above-indicated high pressure by the pair of hydraulic cylinders 50, 52 can be afforded by the high-pressure-port discharge amount Q1 of the working oil from the first and second high-pressure discharge passages 110, 114, irrespective of the shifting state of the continuously variable transmission 18, so that the pressure of the working oil discharged from the first and second low-pressure discharge passages 112, 116 can be kept at the predetermined low level, making it possible to sufficiently reduce the required drive torque of the oil pump 28.

Although one embodiment of this invention has been described by reference to the drawings, it is to be understood that the invention is not limited to the details of the illustrated embodiment, but may be otherwise embodied.

For instance, only one of the first and second high-pressure discharge passages 110, 114 may be provided.

Similarly, only one of the first and second low-pressure discharge passages 112, 116 may be provided.

The first and second oil relief passages 118, 120 need not be provided.

While the oil pump 28 is provided in the vehicular power transmitting system 10 including the continuously variable transmission 18 of the belt type, the oil pump 28 may be provided in a vehicular power transmitting system including any other type of continuously variable transmission.

It is to be understood that the embodiment of the invention have been descried for illustrative purpose only, and that the present invention may be embodied with various other changes and modifications which may occur without departing from the spirit of the invention.

The invention claimed is:

1. A power transmitting system of a vehicle, comprising:
an oil pump of an internal contact gear type having a driving gear rotated about its axis by an engine, an annular driven gear having internal teeth meshing with external teeth of the driving gear and rotatable by the driving gear about an eccentric axis eccentric with respect to the axis of the driving gear, and a housing having a pump chamber accommodating the driving gear and the driven gear, and a high-pressure discharge passage and a low-pressure discharge passage which are open in a side surface of the pump chamber to discharge a working oil from the pump chamber such that the high-pressure discharge passage and the low-pressure discharge passage one after another communicate with a plurality of pressure chambers in the process of decrease of volume of each of the pressure chambers while the pressure chambers are moved in a direction of rotation of the driving and driven gears, the plurality of pressure chambers being formed between mutually meshing surfaces of the external and internal teeth such that the pressure chambers are spaced apart from each other in a circumferential direction of the driving and driven gears, the oil pump being operated such that a pressure of the working oil to be discharged from the low-pressure discharge passage is kept at a predetermined low level that is lower than a pressure of the working oil discharged from the high-pressure discharge passage by a predetermined amount, when an amount of consumption of pressurized working oil can be afforded by only an amount of discharge of the working oil from the high-pressure discharge passage; and
a continuously variable transmission operable with at least a portion of the pressurized working oil,
wherein said amount of discharge of the working oil from said high-pressure discharge passage is determined such that the amount of consumption of the pressurized working oil can be afforded by the amount of discharge of the working oil from said high-pressure discharge passage, during a steady-state running of the vehicle wherein an input shaft speed of said continuously variable transmission is not lower than a predetermined target value for shifting control of the continuously variable transmission.

2. The power transmitting system of the vehicle according to claim 1, wherein the continuously variable transmission includes an input shaft and an output shaft which are disposed parallel to each other, a pair of variable-diameter pulleys respectively mounted on the input and output shafts, a transmission belt engaging V-grooves of the pair of variable-diameter pulleys, and a pair of hydraulic cylinders operated to act on the pair of variable-diameter pulleys for applying a tensioning force to the transmission belt respectively, and wherein the pair of hydraulic cylinders are operated with the pressurized working oil, to change effective diameters of the pair of variable-diameter pulleys for the transmission belt for continuously changing a speed ratio of the continuously variable transmission.

3. The power transmitting system of the vehicle according to claim 1, wherein the amount of discharge of the working oil from said high-pressure discharge passage is determined to be larger than ½ of a total amount of discharge of the working oil from said high-pressure discharge passage and said low-pressure discharge passage.

4. The power transmitting system of the vehicle according to claim 3, wherein the continuously variable transmission includes an input shaft and an output shaft which are disposed parallel to each other, a pair of variable-diameter pulleys respectively mounted on the input and output shafts, a transmission belt engaging V-grooves of the pair of variable-diameter pulleys, and a pair of hydraulic cylinders operated to act on the pair of variable-diameter pulleys for applying a tensioning force to the transmission belt respectively, and wherein the pair of hydraulic cylinders are operated with the pressurized working oil, to change effective diameters of the pair of variable-diameter pulleys for the transmission belt for continuously changing a speed ratio of the continuously variable transmission.

* * * * *